United States Patent [19]

Hanaoka et al.

[11] Patent Number: 4,850,703

[45] Date of Patent: Jul. 25, 1989

[54] METHOD OF MIXING PULVERULENT MATERIALS AND DEVICE FOR PRACTICING THE SAME

[75] Inventors: Kazunari Hanaoka, Nagoya; Hiroshi Ishii, Hirakata, both of Japan

[73] Assignee: Kabushiki Kaisha Matsui Seisakusho, Osaka, Japan

[21] Appl. No.: 67,401

[22] Filed: Jun. 24, 1987

Related U.S. Application Data

[63] Continuation of Ser. No. 784,333, Oct. 4, 1985, abandoned.

[30] Foreign Application Priority Data

Mar. 20, 1985 [JP] Japan .................. 60-56896

[51] Int. Cl.⁴ .................. B01F 15/02; G05D 11/03; G06F 15/46; B65G 53/16
[52] U.S. Cl. .................. 366/160; 222/135; 364/479; 364/502; 366/179; 406/33; 406/106; 406/120; 406/128
[58] Field of Search .................. 366/160, 162, 163, 177, 366/179, 101, 191, 19; 222/367, 368, 55, 135; 137/101.31; 364/479, 502; 406/29, 32, 33, 40, 38, 97, 106, 120, 124, 127, 128, 168, 171, 123; 425/145

[56] References Cited

U.S. PATENT DOCUMENTS

| | | | |
|---|---|---|---|
| 2,164,542 | 7/1939 | Owens | 366/160 X |
| 2,660,034 | 11/1953 | Kemper | 366/101 X |
| 3,076,637 | 2/1963 | Moziek et al. | 366/160 |
| 3,206,254 | 9/1965 | Mylting | 222/368 X |
| 3,410,530 | 11/1968 | Gilman | 366/163 |
| 3,664,640 | 5/1972 | Morin | 366/160 |
| 3,771,770 | 11/1973 | Lehmann | 366/163 |
| 4,430,001 | 2/1984 | Schurr | 366/163 X |
| 4,581,704 | 4/1986 | Mitsukawa | 366/160 X |

FOREIGN PATENT DOCUMENTS 936693  9/1963  United Kingdom .................. 366/160

Primary Examiner—Harvey C. Hornsby
Assistant Examiner—Scott J. Haugland
Attorney, Agent, or Firm—Koda and Androlia

[57] ABSTRACT

A method of mixing pulverulent materials and a device for practicing the method. In this method, the pulverulent material constituting a main material is continuously fed to a conveyor duct connected to a molding machine in fixed quantities while air is being fed to under pressure or drawn from the duct and simultaneously the pulverulent material constituting compounding ingredient material is fed to the duct at a specified value so that a mixing ration is maintained at a specified value. And in the method, a mixing ratio is changeable by variably controlling the amount of supply of compounding ingredient to the main material while feeding air into the duct or drawing air from the duct. In addition, the device is constructed of a pneumatic closed loop duct type and comprises a closed looplike duct, a pulverized reclaimed material feed unit, a virgin material feed unit, and a control means for regulate a mixed ratio.

2 Claims, 10 Drawing Sheets

$(t_c < t_o, \; t_o \ll T_o \rightarrow t'_c > t_o)$
DUTY RATIO $t'_c/T'_v = C_t/V_t$

METHOD OF MIXING PULVERULENT MATERIALS AND DEVICE FOR PRACTICING THE SAME

This is a continuation of application Ser. No. 784,333, filed Oct. 4, 1985, now abandoned.

BACKGROUND OF THE INVENTION

I. Field of the Invention

This invention relates to a method of mixing pulverulant materials by feeding a main pulverulent material and a compounding ingredient pulverulent material into a conveyor duct where air is fed under pressure of is drawn and a device for practicing the method. The pulverulent material herein referred to includes relatively large-grain pulverulent materials, granulated materials, pellets, tablets and the like.

II. Prior Art

Stated with reference to a plastic molding material by way of example, a conventional method of mixing pulverulent materials makes it practice to weigh a virgin material and a compounding material (as used a compounding material is, for example, a pulverized reclaimed materials) on a weigher in accordance with a preset mixing ratio and to mix the materials uniformly by a mixer.

The method described above, however, leaves the following problems to be improved.

Namely, first the method makes it necessary to install the weigher and the mixer in the midway of a material conveyor duct, with the result that the required device becomes large in size and expensive in price. Secondly, when the plastic moldings to be manufactured are changed in kind and mixing ratio, it is necessary to make change of materials by completely removing the material left in the mixer, thus requiring additional labor and reducing production efficiency.

SUMMARY OF THE INVENTION

Accordingly, it is a primary object of the invention to provide a method of mixing pulverulent materials by pneumatic conveyance and a small-size and lightweight mixing device for practicing the method without using an expensive mixer.

Another object of the invention is to provide a pulverulent material mixing method and the device therefore which is simple in operation, can save labor and contribute to an increase in production efficiency.

These and other objects and advantages of the invention will become more apparent according as a description of the invention specification proceeds.

In order to achieve the objects described above, the method of the invention comprises feeding a main pulverulent material to conveyor duct continuously in fixed quantities while feeding air under pressure or drawing air from the duct, and simultaneously feeding a compounding ingredient pulverulent material at a specified intervals to the duct, so that a mixing ratio of the compounding ingredient material is maintained at a specified value. And in preferred embodiments of the invention disclosed herein, the method is classified into two control system i.e. an equalized pulse system and a thinned pulse system.

While, the devices of the invention proposed simultaneously for mixing pulverulent materials comprises a closed looplike duct which comprises a deaerating duct connecting a blower for evacuating an airtight hopper of air to the hopper of a molding machine, a material conveyor duct connected to an inlet of the hopper, and an air duct connecting the blower to the material conveyor duct, a pulverulent reclaimed material feed unit equipped with a weighing mechanism and disposed in the midway of the material conveyor duct, a virgin material feed unit equipped with a weighing mechanism and disposed in series with the pulverulent reclaimed material feed unit, and a control means for controlling the blower and the two weighing mechanism to regulate a mixing ratio of the pulverized reclaimed material constituting a compounding ingredient to a virgin material by feeding the pulverized reclaimed material at a specified intervals from the pulverized reclaimed material feed unit while continuously feeding the main material from the virgin material feed unit in fixed quantities.

According to the method of the invention, a pulverulent material which is a main material is continuously fed into a conveyor duct in fixed quantities and at the same time another pulverulent material which is a compounding ingredient material is fed into the duct at a specified intervals in fixed quantities, with the result that both materials are mixed formly in the duct and a mixing ratio is maintained at a specified value.

Accordingly, the method of the invention has the advantage that since mere control of the amount of material fed into the conveyor duct without weighing the amount of supply each time by a particular weigher or mixer can uniformly mix the pulverulent material under continuous supply of material, the use of the method in the continuous step of production of plastic moldings or the like can increase productivity in a substantial degree.

Moreover, the mixing device of the invention makes it possible to reduce its size and save its weight and, in addition, to save the trouble to clean the mixer of the residues of the material therein each time in replacing the material by a new one, thus facilitating maintenance and inspection and increasing productivity.

BRIEF DESCRIPTION OF THE DRAWINGS

A description will now be given of the invention with reference to the accompanying drawings wherein.

DETAILED DESCRIPTION OF THE INVENTION

According to the invention, a mixing ratio can be changed by variably controlling the amount of supply of a compounding ingredient to a main material while feeding air under pressure into a material conveyor duct or drawing air from the duct. Therefore, the supply of both materials are made in terms of time control and in fixed quantities.

Moreover, according to the invention, pulverulent materials are mixed uniformly while feeding air under pressure into a material conveyor duct or drawing air which is a carrier of the materials from the conveyor duct, therefore the invention can be used with open and closed loop duct system.

Figure 1:
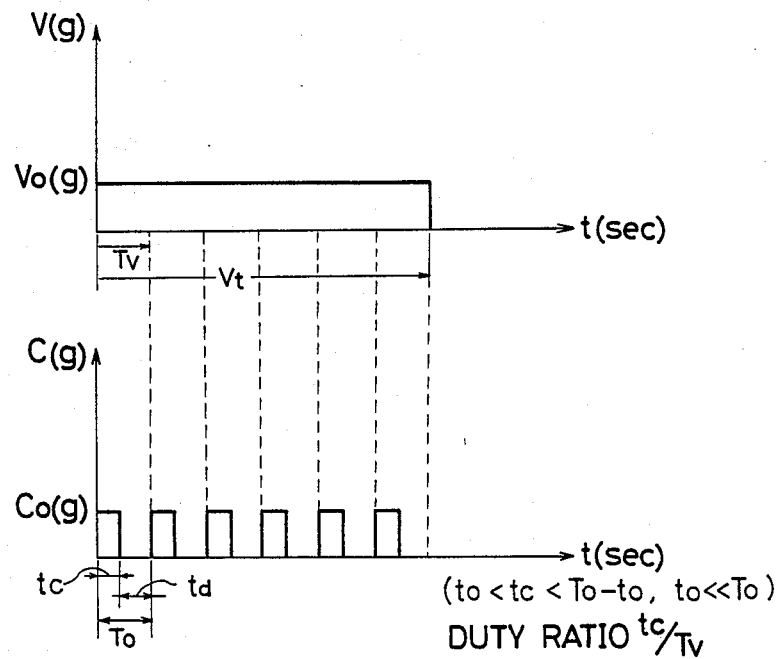
FIG. 1 is a timing chart explaining the basic principle of the method of the invention and showing the state of supply of a main material and a compounding ingredient.

In FIG. 1, the basic principle of the method of the invention is illustrated by a timing chart of one batch conveying time.

FIG. 1 is a diagram showing a relation between an amount of supply V(g) of main material and time t and showing a relation between an amount of supply C(g) of compounding ingredient and time t.

In the description that follows, Vt designates total supply time of the main material per one batch conveying time; Ct total supply time of the compounding ingredient per one batch conveying time; Vo(g) an amount of supply of main material per second; Co(g) an amount of supply of compounding ingredient per second; Tv time of continuous supply of main material within one control cycle; tc real supply time (pulse width) and td designates suspension time of supply of compounding ingredient (pulse interval). The duty ratio of compounding ingredient to main material is specified as tc/Tv and this ratio of variably controlled to change a mixing ratio of the pulverulent materials.

Desirable as a material feeder necessary for practicing the method is a device capable of controlling an amount of supply of main material and compounding ingredient under fixed quantity system in terms of time, for example, a capacitive type feeder such as a rotary valve, a vibration feeder, and a screw feeder are suitably employed. A geared motor or a step motor can be used as an actuator of the feeder.

Further, when the method of the invention is practiced, a fixed quantity feeder is used both for supply of main material and for supply of compounding ingredient, and first, an amount of supply of material within the unit time of the material feeder, a mixing ratio, and control conditions of the fixed quantity feeder to be used are inputted. The control conditions are $T_o$ the time for a complete on and off cycle corresponding to the maximum allowable number of on and off cycles per minute of the compounding ingredient feeder, and $t_0$ the minimum allowable time between successive on and off states of the compounding ingredient feeder.

Figure 2:
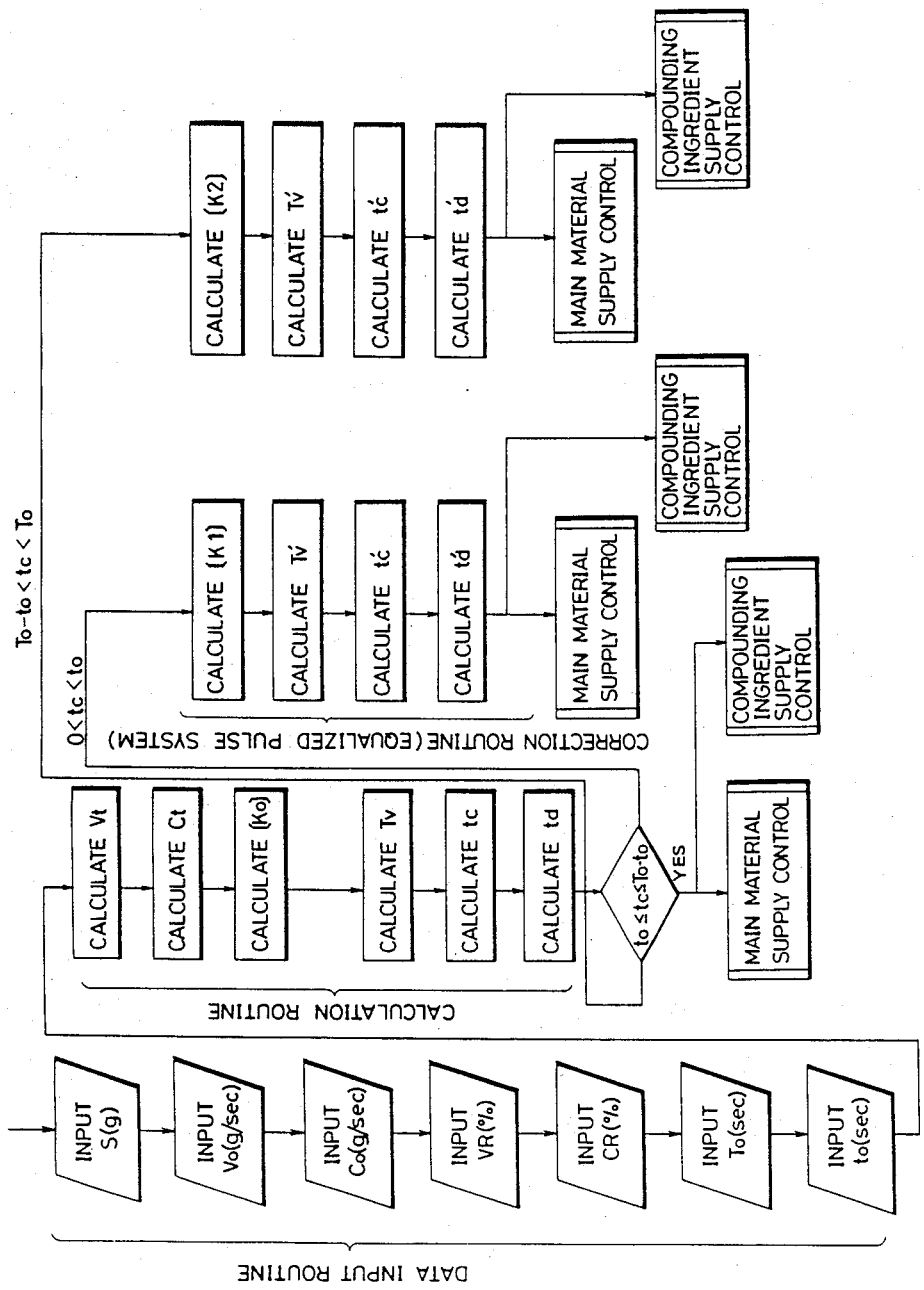
FIG. 2 is an operational flow chart of an equalized pulse system.

FIG. 2 shows a control flow necessary for practicing the method of the invention by the use of a computer system. This control flow shows the case of application of the method of the invention to feeding of material for plastic moldings, wherein a virgin material (pellets) and a pulverized reclaimed material (used as a reclaimed material is, for example, a scrap plastic material) are used as the main material and the compounding ingredient, respectively.

Inputted into the data input routine of control flow are a total quantity of supply S(g) during one batch conveying time of main material and compounding ingredient, a quantity of supply of material per unit time $V_o$ (g/sec) by a virgin material feeder, a quantity of supply of material per unit time Co (s/sec) by a pulverized reclaimed material feeder, a mixing ratio of virgin material VR (%), a mixing ratio of pulverized reclaimed material CR (%), and control conditions $T_o$ (sec) and $t_o$ (sec) of material feeder.

Next, in the calculation routine, the above data inputted by the data input routine is operated to calculate the total supply time of virgin material Vt during the one batch conveying time of material and the total supply time of pulverized reclaimed material Ct, wherein Vt and Ct each represent control parameters calculated by the following equations.

$$Vt = \frac{S \times VR}{Vo \times 100} \text{ (sec)}$$

$$Ct = \frac{S \times CR}{Co \times 100} \text{ (sec)}$$

However, the Vt and Ct calculated therein are provided as the time of total supply during one batch the conveying time of material. Accordingly, to practice the method of the invention, it is further necessary to find continuous supply time Tv of main material per control cycle, real supply time (pulse width) tc per control cycle of intermittent supply of compounding ingredient, and suspended supply time (pulse width) td.

Accordingly, these control parameters are calculated in the calculation routine. Namely, if the control conditions of compounding ingredient are $T_o$ and $t_o$ wherein $T_o >> t_o$, the number of control cycles [Ko] necessary for intermittent suply of compounding material is expressed by the equation [Ko]=Vt/To on the basis of $T_o$ wherein [Ko] is an integer and fractions are omitted.

Accordingly, one control cycle Tv is expressed by the equations $Tv = To$ (sec/cycle)

$tc = (Ct/Vt) \times To$ (sec)

$td = Tv - tc$

Duty ratio $= tc/Tv = Ct/Vt$

Figure 3:
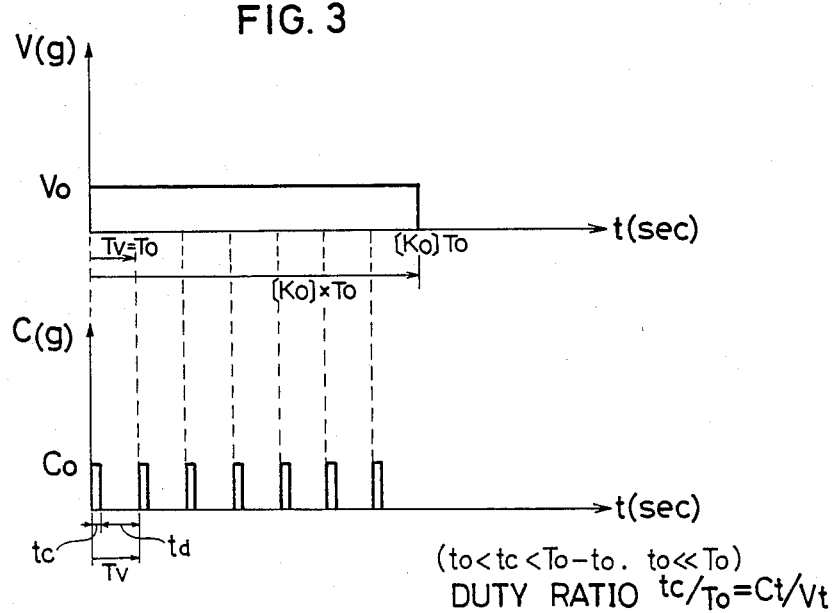
FIG. 3 is a timing chart of control parameter obtained by a calculation routine.

However, in order to make it possible to practice the method of the invention by the use of the control parameters described above, it becomes a necessary and sufficient conditions that drive and stop time $t_c$ and $t_d$ within each control cycle of the compounding feeder should be larger than a minimum control value $t_o$. Accordingly, such a condition as $t_o \leq t_c \leq T_o - t_o$ is estimated in the decision step of control flow. If the control parameters calculated fulfill the above condition, the parameters are employed, and the main material feeder functions in Tv and the compound ingredient feeder makes intermittent supply in a duty ratio of Ct/Vt to practice the method of the invention. FIG. 3 shows a relation between the main material and the compounding ingredient by a timing chart.

Incidentally, if the control parameters calculated have not met the above condition, the following correction routine is carried out to change the value of control parameter into a value which fulfills the control condition.

This correction routine has two modes of operation, the first mode being called an equalized pulse system and the second being a thinned pulse system.

According to the equalized pulse system, the following operation processing is effected.

(1) In the case of $t_o > t_c$

The number of control cycles [K1] necessary for control is $$[K1] = tc \times [Ko]/t_o$$

wherein [K1] is an integer and fractions are omitted.

$$Tv = Vt/[K1] \text{ (sec/cycle)}$$

$$tc = Ct/[K1] \text{ (sec)}$$

$$td = Tv - tc$$

Duty ratio $= tc/Tv = Ct/Vt$

Figure 4A:
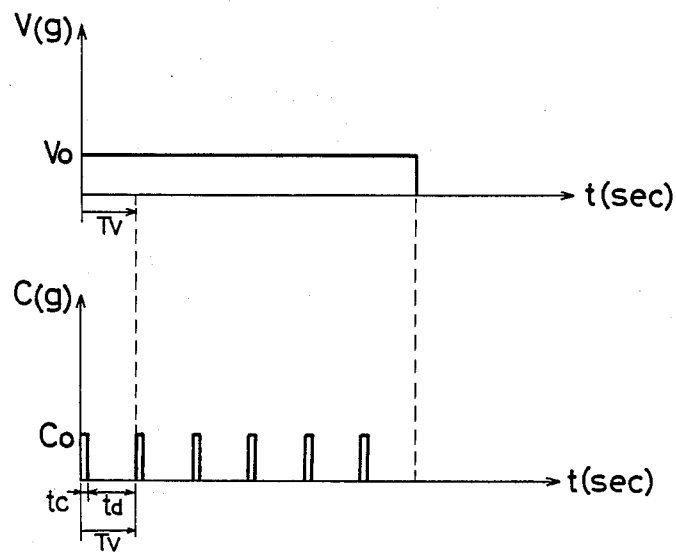
FIGS. 4a and 4b and FIGS. 5a and 5b are timing charts showing equalized pulse systems, respectively.
Figure 4B:
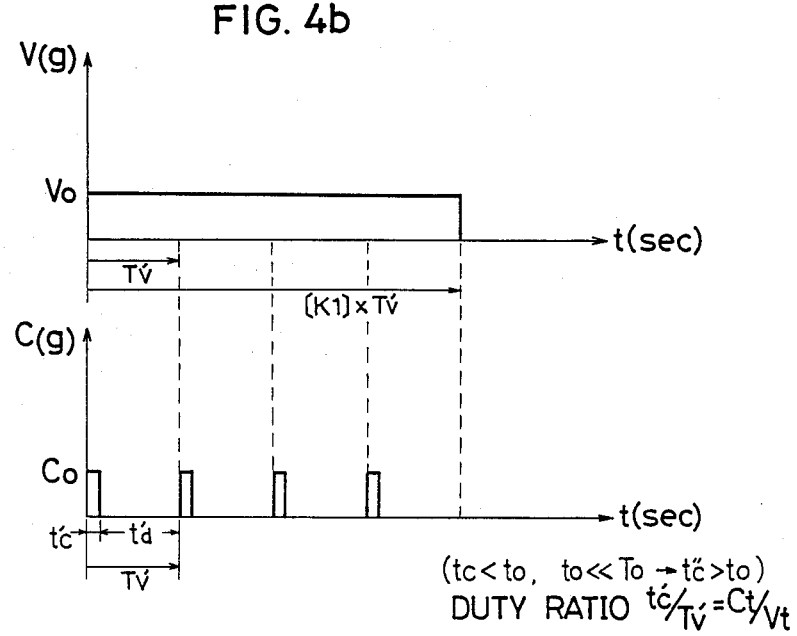

The timing chart in this case is shown in FIG. 4 and its embodiment is shown in calculation example (1A). FIG. 4a shows a timing chart before correction operation and FIG. 4b shows a timing chart after correction operation.

(2) In the case of $t_d < t_o$ namely $To - t_o < t_c$

Now $td = To - tc$,

The number of control cycles [K2] necessary for control is $$[K2] = td \times [Ko]/t_o \text{ wherein [K2] represents an integer and fractions are omitted.}$$

$$Tv = Vt/[K2] \text{ (sec/cycle)}$$

$$tc = Ct/[K2] \text{ (sec)}$$

$$td = Tv - tc$$

Duty ratio $= tc/Tv = Ct/Vt$

Figure 5A:
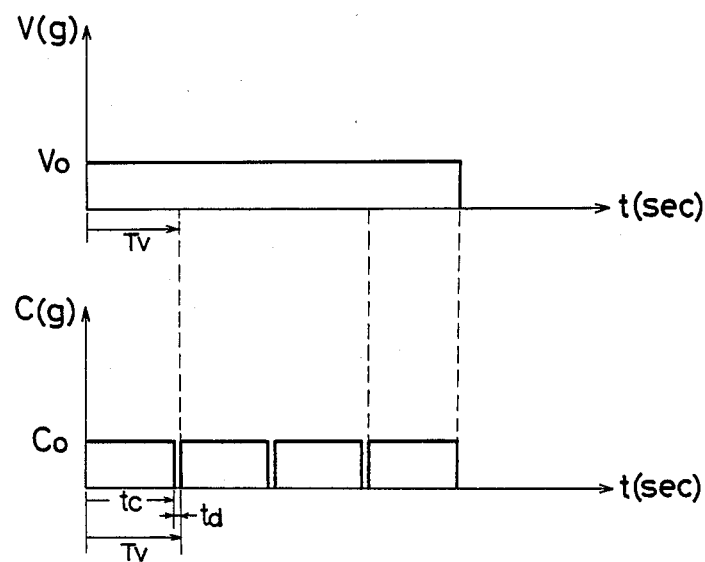
Figure 5B:
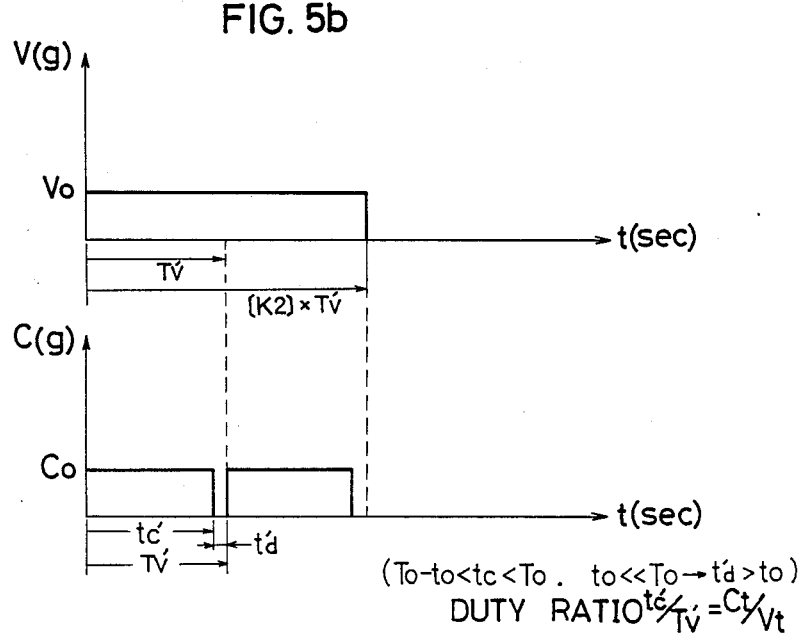

The timing chart in this case is shown in FIG. 5 and its embodiment is shown by a calculation example (1B), and FIG. 5a shows a timing chart before correction operation, while FIG. 5b shows a timing chart after correction operation.

Figure 6:
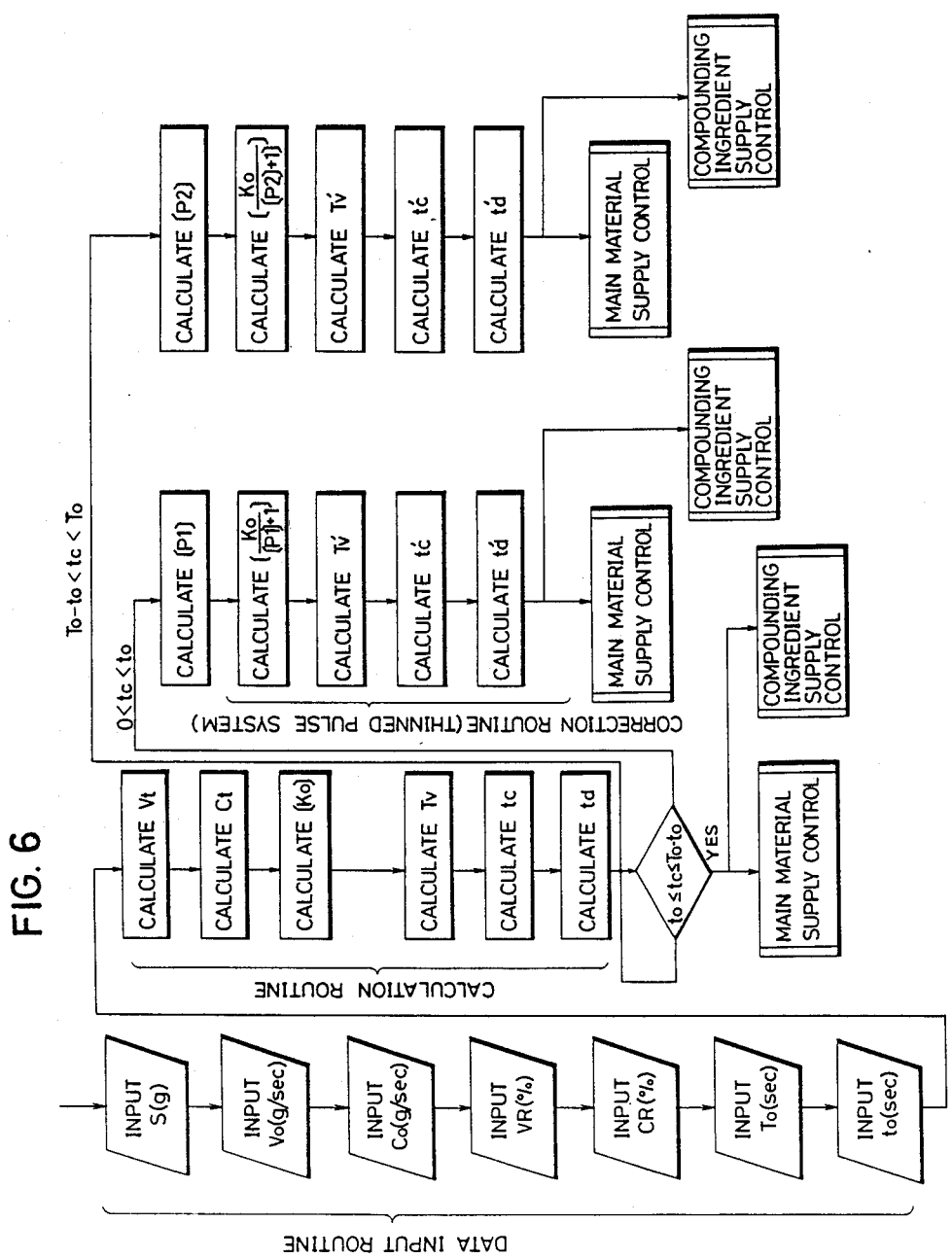
FIG. 6 is an opeational flow control of control flow of another embodiment of the method of the invention.

Next, a description will be given of the thinned pulse system which is the second mode of correction routine (a control flow in this case is shown in FIG. 6).

(1) In the case of $t_o > t_c$

If the number of pulses to be thinned out is [P1], $$[P1] = [to/tc] - 1$$

wherein [to/tc] represents an integer and fractions are raised to a unit.

The number of control cycles [K1] necessary for control is $$[K1] = [Ko/([P1]+1)]$$

wherein [K1] is an integer and fractions are omitted.

$$Tv = Vt([P1]+1) \text{ (sec/cycle)}$$

$$tc = Tc([P1]+1) \text{ (sec)}$$

$$td = Tv - tc$$

Figure 7A:
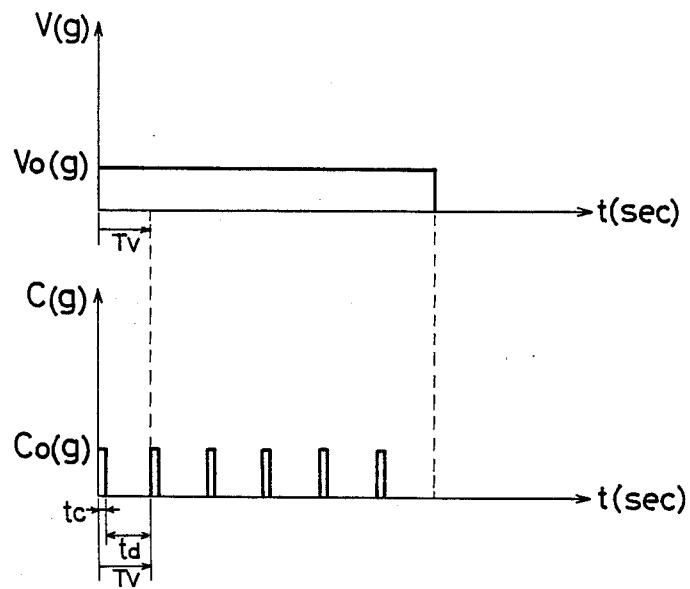
FIGS. 7a and 7b and FIGS. 8a and 8b are timing charts of a thinned pulse system, respectively.
Figure 7B:
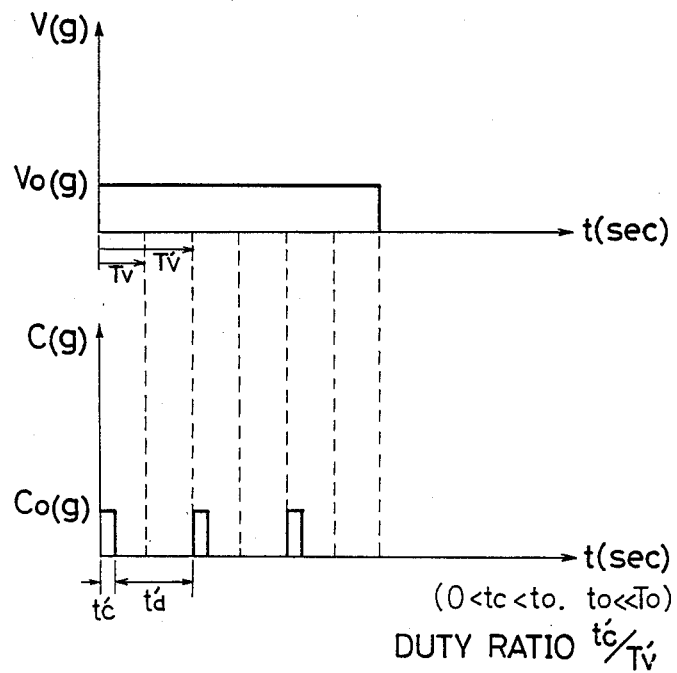

The timing chart in this case is shown in FIG. 7 and its embodiment is shown by calculation example (2A), and FIG. 7a shows a timing chart before correction operation, and FIG. 7b shows a timing chart after correction operation.

(2) In the case of $t_d < t_o$ namely $To - t_o < tc$

Now $td = To - tc$, and the number of pulses to be thinned out is [P2], $$[P2] = [to/td] - 1$$

wherein [to/td] is an integer and fractions are raised to a unit.

The number of cycles necessary for control [K2] is, $$[K2] = [Ko/([P2]+1)]$$

wherein [K2] is an integer and fractions are omitted.

$$Tv = Vt ([P2]+1) \text{ (sec/cycle)}$$

$$tc = tc([P2]+1) \text{ (sec)}$$

$$td = Tv - tc$$

Figure 8A:
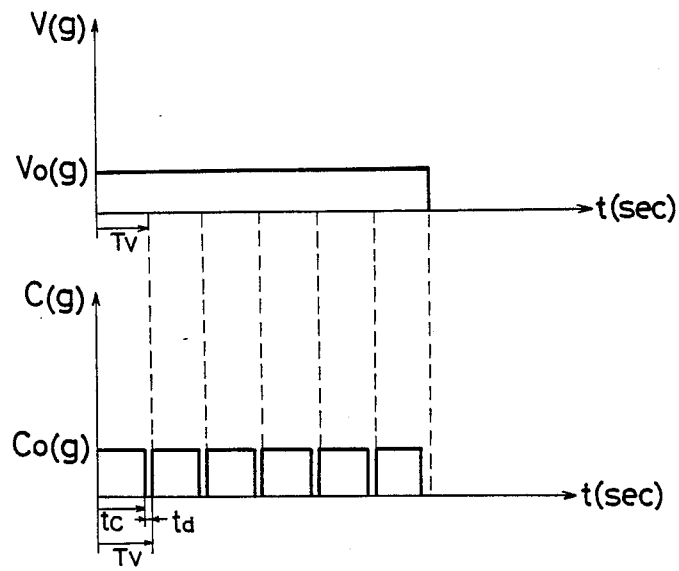
Figure 8B:
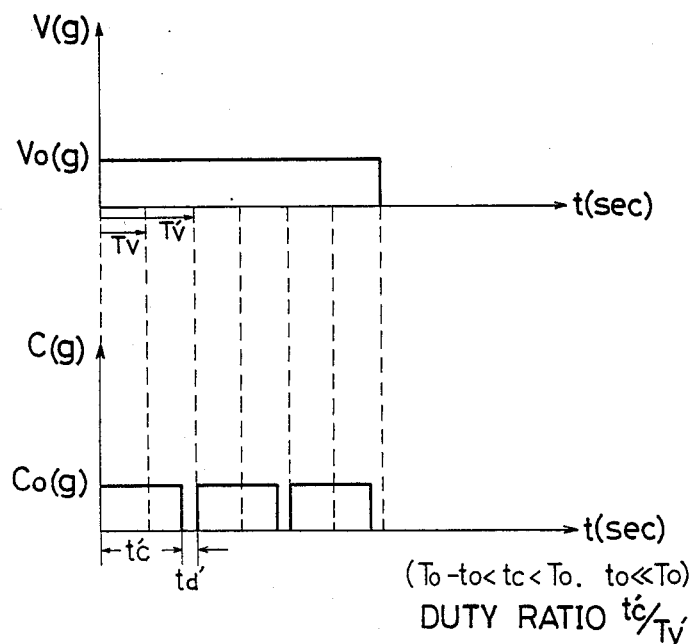

The timing chart in this case is shown in FIG. 8 and its embodiment is shown by calculation example (2B), and FIG. 8a shows a timing chart before correction operation, while FIG. 8b shows a timing chart after correction operation.

Figure 9:
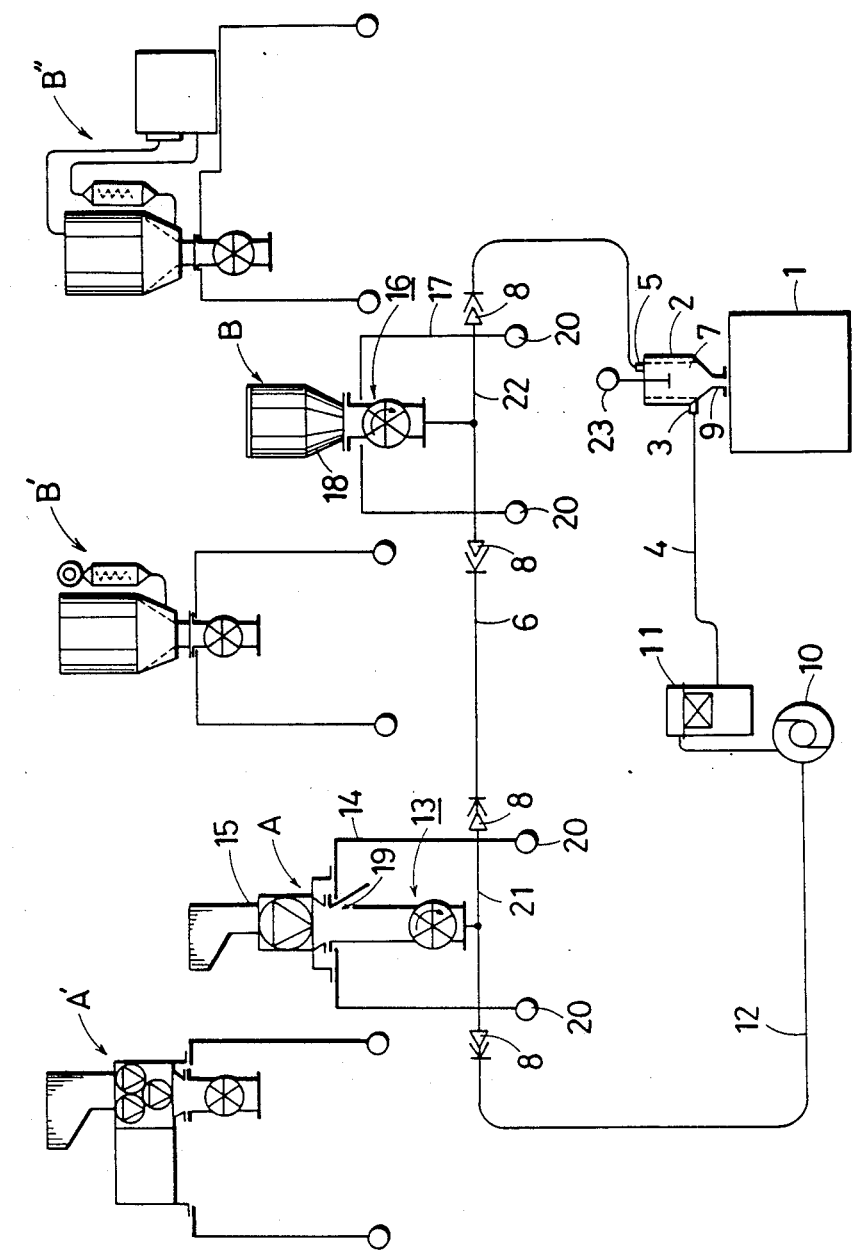
FIG. 9 is a schematic diagram of the pulverulent material mixing device of the invention.

FIG. 9 shows an embodiment of the pulverulent material mixing device of the invention. The embodiment shows the mixing device using a closed loop pneumatic conveyor.

In FIG. 9, the reference numeral 1 designates a molding machine; 2 a hopper; 6 a material conveyor duct; 10 a blower; A a feed unit for feeding a pulverized reclaimed material which is a compounding ingredient (referred to as a pulverized reclaimed material feed unit); and B designates a feed unit for feeding a virgin material which is a main material (referred to as a virgin material feed unit).

As seen from the drawing, the device of the invention is designed to forcedly transfer a pulverulent material to a molding machine 1 while mixing the material supplied from each of a pulverized reclaimed material feed unit A and a virgin material unit B within the conveyor duct 6 by a so-called closed loop pneumatic conveyor in which a blower 10 is operated to evacuate the molding machine 1 of air.

Referring to the construction of each unit of the device described above, a hopper 2 is of airtight structure closed with a cover and is provided inside with a cylindrical filter 7. The mixing material drawn in through an inlet 5 of the hopper is once stored inside the cylindrical filter 7 and is fed from an outlet 9 at the bottom of the hopper to the molding machine 1, and the air flowed into the hopper 2 together with the mixing material is passed through the filter 7 to escape from an air outlet 3 to permit air circulation.

Further, at the end of a deaerating duct 4 are disposed a blower 10 for evacuating the hopper 2 of air and reducing pressure therein and a bag filter 11 for prevention of dust. The blower 10 and a conveyor duct 6 are connected by an air feed duct 12 to each other to form a closed loop-like duct as a whole.

The pulverized reclaimed material feed unit A and the virgin material feed unit B are arranged in series with the conveyor duct 6 and both units include pedestals 14, 17 (shown in the embodiment as being provided on the bottom with casters 20 so as to be movable) having constant-speed rotary valves 13, 16 as fixed quantity weighing mechanisms, respectively. A crusher 15 and a material tank 18 are mounted on each of the pedestals 14 and 17. The material feed units A and B each are replaceable detachably from the duct 6, and the rotary valves 13 and 16 are designed to have their operation time controlled individually by control means. Formed in the units A and B in the embodiment are through-passages 21 and 22 passing horizontally through each of the pedestals 14 and 17, and the passage 21 and 22 are communicated with the outlet of each rotary valve 13 and 16. A one-touch coupler 8 is provided at the open end of each through-passage 21, 22 so that the open ends of the passages 21 and 22 can be replaceably connected with the open ends of the duct 6 by one operation.

The material feed units A and B are provided in the combined form of at least one or more pairs of feed units A and B, and respectively different types of crusher 15 and virgin material tank 18 containing virgin pellets therein are mounted on the top of each pedestal 14 and 17 detachably attached to the duct 6 so that reclaimed material and virgin material of the kinds corresponding to plastic moldings to be manufactured may be fed in fixed quantities.

In FIG. 9, these different types of material feed units A and B are shown by reference characters A, A', B, B', B'', and particularly with reference to the virgin material feed unit, one which is capable of drying the material is indicated by B' and one capable of dehumidifying the material is indicated by B''.

Figure 10:
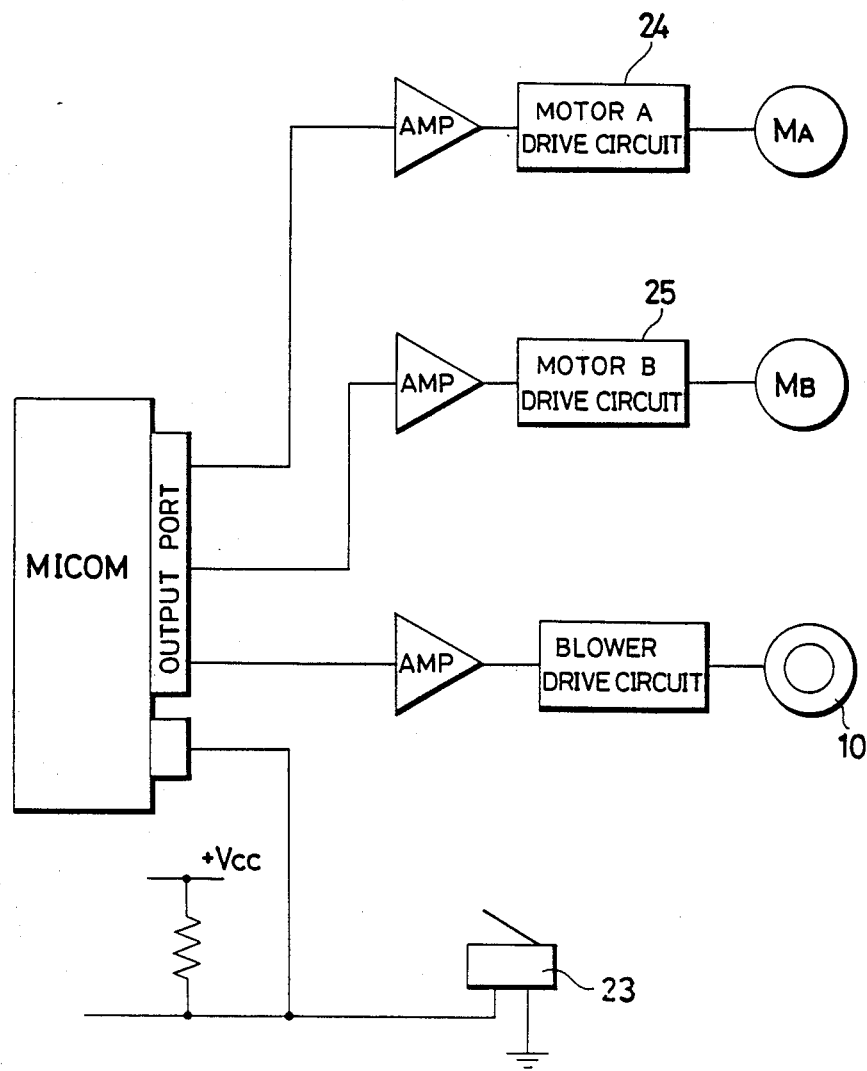
FIG. 10 is a diagram showing one example of the control means for controlling the device.

FIG. 10 shows an embodiment of control means of the material feed units A and B in which microcomputer is used. In the embodiment, the reference characters $M_A$, $M_B$, and 10 designate a drive motor for the rotary valve 13 of pulverized reclaimed material feed unit A, a drive motor for the rotary valve 16 of virgin material feed unit B, and a blower, respectively, and 23 designates a level detector installed in the making machine 1.

In this conjunction, a geared motor or a step motor can be suitably used as an actuator for controlling rotation of the rotary valves 13 and 16 of the units A and B used in practicing the method of the invention, and it is understood that especially the use of the step motor can increase the accuracy of a mixing ratio of compounding ingredient to the main material.

Figure 11:
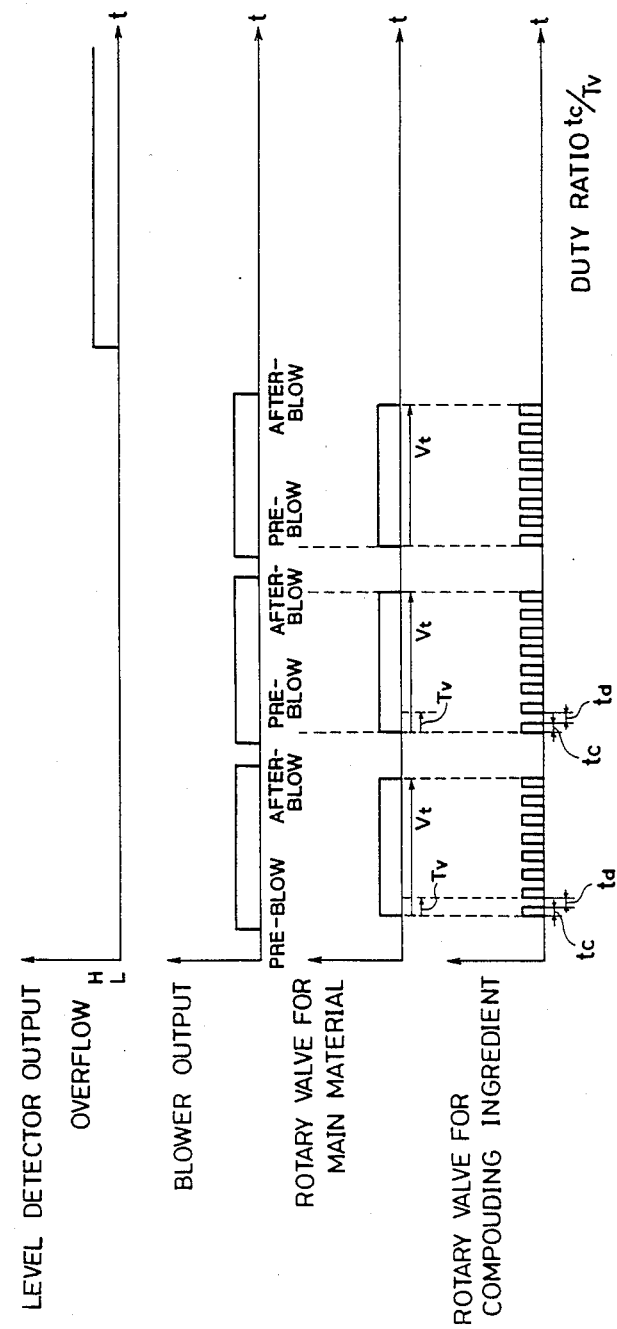
FIG. 11 is a timing chart explaining an operational procedure for controlling the device.

FIG. 11 is a timing chart explaining the operation of the device shown in FIG. 9 in practicing the method of the invention.

As apparent from FIG. 11, according to the method of the invention, the material supply from the units A and B is made intermittently each one batch conveying time, and the supply/stop of this material is carried out by synchronously switching on and off the rotation of the rotary valves 13 and 16 of the units A and B with using pulse signals responsive to the control parameters calculated above. The level detector 23 disposed on the molding machine 1 checks whether or not the mixing material stored in the hopper 2 exceeds the specified upper limit level and, when not in excess, the detector 23 outputs a supply continuance signal into CPU (central processing unit) for continued supply of mixing material, and when the material in the hopper exceeds the upper limit level, the detector outputs a stop signal into CPU.

In the embodiment, this level detector 23 comprises a capacitance-operated level detector, and is so designed that its contact is closed to output a supply stop signal ("L" level signal) into CPU when the level of the material exceeds the upper limit level.

On the other hand, the CPU reads the signal sent from the detector 23 and when the signal is a supply continuance signal, the CPU, in turn, sends a signal responsive to the calculated control parameters to the driver circuits 24 and 25 of the rotary valves 13 and 16 to thereby control the rotation of each valve 13, 16 to continue supply of material, and stops the feed of the next batch conveying, if it receives a supply stop signal outputted from the detector 23.

When the material is conveyed by the method described above, transfer of the material is not interrupted in the midway through the time of transfer of one batch of material, and the material responsive to the preset mixing ratio is continuously supplied individually from each of the feed units A and B. Accordingly, there is no possibility of the material changing in mixing ratio in the midst of production and forming variations in the quality of moldings.

Further, the blower 10 used for conveying the mixing material through the duct 6 to the molding machine 1 is also operated before and after the rotation of the rotary valves 13 and 16 as preblow and after-blow in order to prevent loading due to the mixing materials left in the duct 6. This kind of operation becomes possible by adding a delay circuit. When the blower 10 attains the specified air flow rate, rotation of the rotary valves 13 and 16 of the units A and B is synchronously controlled, so that the materials are drawn into the duct 6, mixed with each other, and reach the mixing machine 1.

Further, the material conveyor shown in FIG. 9 feeds the compounding material intermittently in fixed quantities while continuously feeding a main material in fixed quantities through the duct and the flow of suction air created in the closed loop duct in evacuating the making machine 1 of air. Accordingly, since the conveyor makes it possible to continuously transfer the main material and the compounding ingredient to the making machine 1 while mixing the material with the ingredient uniformly, the present device enables continuous production of plastic moldings excellent in productivity and small in quality variation.

Also, since the device of the type described transfers the materials inside the closed loop, the dust-laden air inside the hopper is not discharged outside but is circulated inside the closed loop duct, with the result that sanitary environment can be kept with little or no possibility of the dust being scattered around. In addition, since the device allows air to circulate inside the closed loop duct in the manner described without letting in air from the open air, the dew-point in the duct is held substantially constant and the material which is being transferred through the material duct is prevented from re-absorbing moisture.

CALCULATED EXAMPLE (1A)

Example of $t_c < t_o$ $VR$ (%) = 97, $V_o$ (g/sec) = 1.6

$CR$ (%) = 3, $C_o$ (g/sec) = 1.2

$T_o$ (sec) = 10

$t_o$ (sec) = 0.5

$S$ (g) = 100

$Vt = \dfrac{S (g) \times VR (\%)}{V_o (g/sec) \times 100} = \dfrac{100 \times 97}{1.6 \times 100} = 60.625$ (sec)

$Ct = \dfrac{S (g) \times CR (\%)}{C_o (g/sec) \times 100} = \dfrac{100 \times 3}{1.2 \times 100} = 2.5$ (sec)

-continued $[K_o] = Vt/T_o = 60.625/10 = 6.0625 = 6$ (times)

$T_v = T_o = 10$ (sec/cycle)

$t_c = (Ct/Vt) \times T_o = (2.5/60.0625) \times 10 = 0.412$ (sec/cycle)

Since $t_c < t_o$, we have $[K1] = t_c \times [K_o]/t_o = 0.4124 \times 6/0.5 = 4.95 = 4$ (times)

$T_v = Vt/[K1] = 60.625/4 = 15.17$ (sec)

$t_c = Ct/[K1] = 2.5/4 = 0.625$ (sec)

$t_d = T_v - t_c = 15.17 - 0.625 = 14.55$ (sec)

Duty ratio $= t_c/T_v = Ct/Vt = 4.1$ (%)

CALCULATION EXAMPLE (1B)

Example of $t_d < t_o$ $VR$ (%) = 58, $V_o$ (g/sec) = 1.6

$CR$ (%) = 42, $C_o$ (g/sec) = 1.2

$T_o$ (sec) = 10

$t_o$ (sec) = 0.5

$S$ (g) = 100

$Vt = \dfrac{S(g) \times VR(\%)}{V_o(g/sec) \times 100} = \dfrac{100 \times 58}{1.6 \times 100} = 36.25$ (sec)

$Ct = \dfrac{S(g) \times CR(\%)}{C_o(g/sec) \times 100} = \dfrac{100 \times 42}{1.2 \times 100} = 35$ (sec)

$[K_o] = Vt/T_o = 36.25/10 = 3.625 = 3$ (times)

$T_v = T_o = 10$ (sec/cycle)

$t_c = (Ct/Vt) \times T_o = (35/36.25) \times 10 = 9.655$ (sec/cycle)

But since $t_d < t_o$, we have $[K1] = t_d \times [K_o]/t_o = 0.345 \times 3/0.5 = 2.069 = 2$ (times)

$T_v = Vt/[K1] = 36.25/2 = 28.125$ (sec)

$t_c = Ct/[K1] = 35/2 = 17.5$ (sec)

$t_d = T_v - t_c = 18.125 - 17.5 = 0.625$ (sec)

Duty ratio $= t_c/T_v = Ct/Vt = 96.6$ (%)

CALCULATION EXAMPLE (2A)

Example of $t_c < t_o$ $VR$ (%) = 97, $V_o$ (g/sec) = 1.6

$CR$ (%) = 3, $C_o$ (g/sec) = 1.2

$T_o$ (sec) = 10

$t_o$ (sec) = 0.5

$S$ (g) = 100

$Vt = \dfrac{S(g) \times VR(\%)}{V_o(g/sec) \times 100} = \dfrac{100 \times 97}{1.6 \times 100} = 60.625$ (sec)

$Ct = \dfrac{S(g) \times CR(\%)}{C_o(g/sec) \times 100} = \dfrac{100 \times 3}{1.2 \times 100} = 2.5$ (sec)

$[K_o] = Vt/T_o = 60.625 = 6$ (times)

$T_v = T_o = 10$ (sec/cycle)

-continued $t_c = (Ct/Vt) \times T_o = 0.412$ (sec/cycle)

But since $t_c < t_o$, we have $[P1] = [t_o/t_c] - 1 = [1.24] - 1 = 2 - 1 = 1$ $[K1] = [K_o/([P1] + 1)] = 6/2 = 3$ $t_c = t_c \times ([P1] + 1) = 0.412 \times 2 = 0.824$ (sec)

$T_v = ([P1] + 1) \times T_v = 2T_o = 20$ (sec)

$T_v = t_c + t_d$, and hence, we have $t_d = T_v - t_c = 20 - 0.824 = 19.176$ (sec)

CALCULATION EXAMPLE (2B)

Example of $t_d < t_o$ $VR$ (%) = 58, $V_o$ (g/sec) = 1.6

$CR$ (%) = 42, $C_o$ (g/sec) = 1.2

$T_o$ (sec) = 10

$t_o$ (sec) = 0.5

$S$ (g) = 100

$Vt = \dfrac{S(g) \times VR(\%)}{V_o(g/sec) \times 100} = \dfrac{100 \times 58}{1.6 \times 100} = 36.25$ (sec)

$Ct = \dfrac{S(g) \times CR(\%)}{C_o(g/sec) \times 100} = \dfrac{100 \times 42}{1.2 \times 100} = 35$ (sec)

$[K_o] = Vt/T_o = 36.25/10 = 3.625 = 3$ (times)

$T_v = T_o = 10$ (sec/cycle)

$t_c = (Ct/Vt) \times T_o = (35/36.25) \times 10 = 9.655$ (sec/cycle)

$t_d = T_v - t_c = 10 - 9.655 = 0.345$ (sec)

$t_d < t_o$ and hence, we have $[P2] = [t_o/t_d] - 1 = [0.5/0.345] - 1 = 2 - 1 = 1$ (time)

$[K2] = [K_o/([P2] + 1)] = 3/2 = 1$ (time)

$t_d = t_d \times ([P2] + 1) = 0.345 \times 2 = 0.69$ (sec)

$T_v = T_v \times ([P2] + 1) = 2T_o = 20$ (sec)

$t_c = T_v - t_d = 20 - 0.310 = 19.69$ (sec)

What is claimed is:

1. A device for mixing pulverulent materials comprising:

closed looplike material conveyor duct wherein the material is conveyed and mixed, said duct comprising a deaerating duct connecting a blower to an airtight hopper of a molding machine, said blower evacuating the hopper of air, a material conveyor duct connected to an inlet of said hopper, and an air duct connecting said blower to said material conveyor duct;

a pulverized reclaimed material feed unit equipped with a rotary valve driven by a geared motor, said unit being disposed in said material conveyor duct, said pulverized reclaimed material feed unit having a movable pedestal and a material feed unit mounted on the pedestal, and which is adapted to be detachably connected to said closed looplike material conveyor duct by means of a pair of couplings;

a virgin material feed unit equipped with a rotary valve driven by a geared motor, said unit being disposed in said material conveyor duct and being disposed in series with said pulverized reclaimed material feed unit, said virgin material feed unit having a movable pedestal and a material feed unit mounted on the pedestal and which is adapted to be detachably connected to said closed looplike material conveyor duct by means of a pair of couplings;

a control means for driving said blower and the rotary valve of each of said pulverized reclaimed and virgin material feed units, said control means dividing the material to be conveyed into a plurality of batches each corresponding to a batch conveying time which is sectioned by a pause time during which said pulverized reclaimed material and said virgin material are not fed into said material conveyor duct for performing pre-blow and after-flow practice, and being adapted to continuously drive said blower and to continuously drive the rotary valve of said virgin material feed unit during one batch conveying time and to simultaneously drive the rotary valve of said pulverized reclaimed material feed unit intermittently so that said pulverized reclaimed material is supplied intermittently in a series of equal pulses such that the materials are supplied in a desired ratio, the control means (a) calculating an initial pulse size based on a control time $T_o$ corresponding to the maximum number of on-off switching cycles permitted by the geared motor of the pulverized reclaimed material feed unit, (b) driving the pulverized reclaimed material feed unit such that the size of each pulse is equal to the initial pulse size when the initial pulse size falls within an allowable range determined by the control time $T_0$ and a minimum control time $t_o$ between successive on and off states permitted by the geared motor of the pulverized reclaimed material feed unit, and (c) calculating a new pulse size that falls in the range using a pulse equilization method and driving the pulverized reclaimed material feed unit such that the size of each pulse is equal to the new pulse size when the initial pulse size is not in the range.

2. A device for mixing pulverulent materials comprising:

closed looplike material conveyor duct wherein the material is conveyed and mixed, said duct comprising a deaerating duct connecting a blower to an airtight hopper of a molding machine, said deaerating duct evacuating the hopper of air, a material conveyor duct connected to an inlet of said hopper, and an air duct connecting said blower to said material conveyor duct;

a pulverized reclaimed material feed unit equipped with a rotary valve driven by a geared motor, said unit being disposed in said material conveyor duct, said pulverized reclaimed material feed unit having a movable pedestal and a material feed unit mounted on the pedestal, and being adapted to be detachably connected to said closed looplike material conveyor duct by means of a pair of couplings;

a virgin material feed unit equipped with a rotary valve driven by a geared motor, said unit being disposed in said material conveyor duct and being disposed in series with said pulverized reclaimed material feed unit, said virgin material feed unit having a movable pedestal and a material feed unit mounted on the pedestal, and being adapted to be detachably connected to said closed looplike material conveyor duct by means of a pair of couplings;

a control means for driving said blower and the rotary valve of each of said pulverized reclaimed and virgin material feed units, said control means dividing the material to be conveyed into a plurality of batches each corresponding to a batch conveying time which is sectioned by pause time during which said pulverized reclaimed material and said virgin material are not fed into said material conveyor duct for performing preblow and after-blow practice, and being adapted to continuously drive said blower and to continuously drive the rotary valve of said virgin material feed unit during one batch conveying time to continuously feed said virgin material during one batch conveying time and to simultaneously drive the rotary valve of said pulverized reclaimed material feed unit intermittently so that said pulverized reclaimed material is supplied intermittently in a series of equal pulses such that the materials are supplied in a desired ratio, the control means (a) calculating an initial pulse size based on a control time $T_o$ corresponding to the maximum number of on-off switching cycles permitted by the geared motor of the pulverized reclaimed material feed unit, (b) driving the pulverized reclaimed material feed unit such that the size of each pulse is equal to the initial pulse size when the initial pulse size falls within an allowable range determined by the control time $T_o$ and a minimum control time $t_o$ between successive on and off states permitted by the geared motor of the pulverized reclaimed material feed unit, and (c) calculating a new pulse size that falls in the range using a pulse thinning method and driving the pulverized reclaimed material feed unit such that the size of each pulse is equal to the new pulse size when the initial pulse size is not in the range.

* * * * *